(12) United States Patent
DeStefano et al.

(10) Patent No.: US 10,853,869 B2
(45) Date of Patent: Dec. 1, 2020

(54) ELECTRONIC WISH LIST SYSTEM

(71) Applicant: TARGET BRANDS INC., Minneapolis, MN (US)

(72) Inventors: Heather DeStefano, Plymouth, MN (US); Erica Thein, Edina, MN (US); Jaye Thompson, Minneapolis, MN (US); John Biondi, Golden Valley, MN (US); Anthony Madson, Excelsior, MN (US); Lee Knight, Danville, KY (US)

(73) Assignee: Target Brands, Inc., Minneapolis, MN (US)

( * ) Notice: Subject to any disclaimer, the term of this patent is extended or adjusted under 35 U.S.C. 154(b) by 843 days.

(21) Appl. No.: 14/924,537

(22) Filed: Oct. 27, 2015

(65) Prior Publication Data

US 2016/0117754 A1    Apr. 28, 2016

Related U.S. Application Data

(60) Provisional application No. 62/069,244, filed on Oct. 27, 2014.

(51) Int. Cl.
   *G06Q 30/00*    (2012.01)
   *G06Q 30/06*    (2012.01)
   *G06Q 50/00*    (2012.01)

(52) U.S. Cl.
   CPC ..... *G06Q 30/0633* (2013.01); *G06Q 30/0643* (2013.01); *G06Q 50/01* (2013.01)

(58) Field of Classification Search
   CPC .................................................. G06Q 30/0633
   See application file for complete search history.

(56) References Cited

U.S. PATENT DOCUMENTS

| 7,711,611 B2 | 5/2010 | Martineau et al. |
| 9,519,932 B2 * | 12/2016 | Calman .............. G06Q 30/0633 |
| 2008/0154632 A1 * | 6/2008 | Jacobi ............... G06F 17/30867 |
| | | 705/26.1 |

(Continued)

OTHER PUBLICATIONS

Chen, Yung-Yao, Kuan-Yu Chi, and Kai-Lung Hua. "Design of image barcodes for future mobile advertising." EURASIP Journal on image and video processing 2017.1 (2017): 1-12.*

(Continued)

*Primary Examiner* — Kathleen Palavecino
(74) *Attorney, Agent, or Firm* — Hamre, Schumann, Mueller & Larson, P.C.

(57) ABSTRACT

Wish list systems, user interfaces, and methods are disclosed. The electronic wish list system includes an application loadable onto a user device that includes a display, and when loaded onto the user device, permits a wish list creator to review and select one or more items for inclusion in an electronic wish list, communicate with a server to send to the server the electronic wish list, and to cause display of the electronic wish list on the display. The server is able to communicate with the user device and configured to receive the electronic wish list, identify product information about the one or more items, and send the electronic wish list with the product information to the application. The application permits the wish list creator to share the electronic wish list via an electronic message, and to notify a wish list owner that the electronic wish list was shared.

16 Claims, 14 Drawing Sheets

(56) References Cited

U.S. PATENT DOCUMENTS

| | | | | |
|---|---|---|---|---|
| 2009/0061901 | A1* | 3/2009 | Arrasvuori | G06Q 30/00 |
| | | | | 455/456.3 |
| 2011/0145068 | A1* | 6/2011 | King | G06F 17/211 |
| | | | | 705/14.55 |
| 2015/0112836 | A1* | 4/2015 | Godsey | G06Q 30/0613 |
| | | | | 705/26.41 |
| 2015/0278888 | A1* | 10/2015 | Lu | G06Q 30/0601 |
| | | | | 705/14.64 |
| 2015/0278920 | A1* | 10/2015 | Huang | G06F 17/30867 |
| | | | | 705/26.8 |

OTHER PUBLICATIONS

"Babies R Us Wish List," printed Feb. 18, 2016 from the Wayback Machine Web Archive (https://web.archive.org/web/20081014135723/http://www.toysrus.com/wishlist/index.jsp), available at least as of Oct. 14, 2008; 2 pages.

"The Metaio SDK," printed on Feb. 18, 2016 from the Wayback Machine Web Archive, https://web.archive.org/web/20140622071859/http://www.metaio.com/products/sdk/online-apps (dated Jun. 22, 2014); 2 pages.

\* cited by examiner

ELECTRONIC WISH LIST SYSTEM

BACKGROUND

Consumers purchase products in retail stores and via retail websites accessible from the Internet. Shopping via a retail website allows consumers to interact with pictures, videos, and/or audio clips relating to the products the consumer is contemplating purchasing. Often, shopping via the retail website allows the consumer to view reviews by other consumers, search for related products, search for products that other consumers bought at the same time, or the like. In some instances, the inventory of products available from a retailer through the retail website can be different from the products available at the retail store.

Improved ways to enhance a consumer's shopping experience are desirable.

SUMMARY

Wish list systems, user interfaces, and methods are described that provide a way to complete and manage one or more electronic wish lists.

A method for facilitating preparation of an electronic wish list is disclosed. The method includes providing an application for a user device, the user device having a display, the application permitting a wish list creator to select one or more items to be added to the electronic wish list; receiving a selection of the one or more items from the user device; adding the selection of the one or more items to the electronic wish list; and providing an electronic message for sharing the electronic wish list.

An electronic wish list system is also disclosed. The electronic wish list system includes an application that is loadable onto a user device, the user device including a display. When the application is loaded onto the user device, the application permits a wish list creator to review and select one or more items for inclusion in an electronic wish list, communicate with a server to send to the server the electronic wish list, and to receive from the server the electronic wish list. The application is configured to cause to display the electronic wish list on the display. The server is able to communicate with the user device and configured to receive the electronic wish list from the user device, identify product information about the one or more items on the wish list, and send the electronic wish list with the product information to the application. The application permits the wish list creator to share the electronic wish list via an electronic message, and in response to the sharing, a wish list owner is notified that the electronic wish list was shared.

A server useable in an electronic wish list system including a mobile device with image capture means, input means, and display means is disclosed. The server includes a wish list management means configured to receive from the mobile device a selection of one or more items captured by the image capture means of the mobile device or received from the input means of the device, and stored for a wish list corresponding to a user of the mobile device; a wish list sharing generation means in communication with the wish list management means and configured to generate an electronic message, the electronic message including the one or more items stored for the wish list; and the server being configured to communicate with the mobile device to send the electronic message to the mobile device for sharing of contents of the wish list.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

Figure 1:
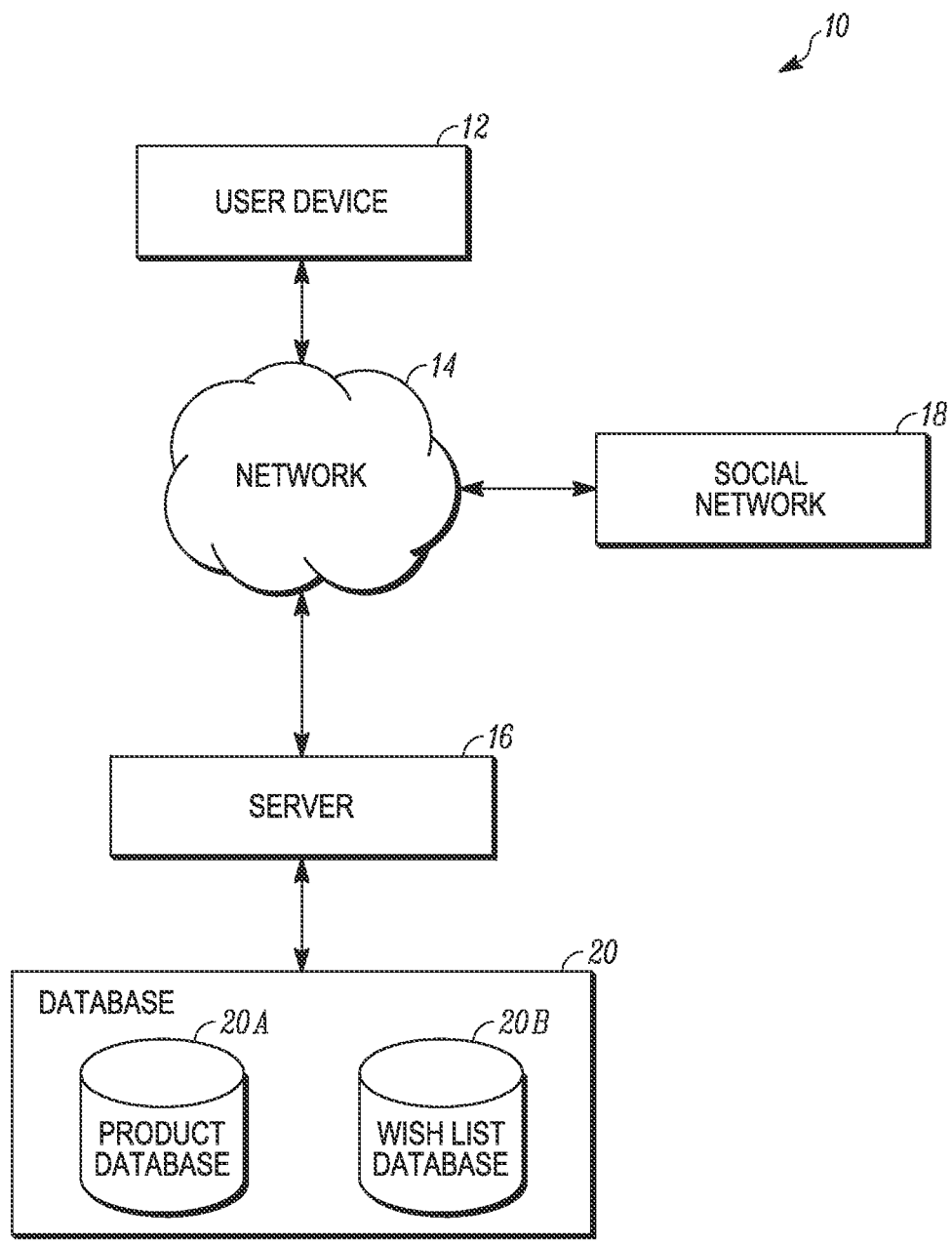
FIG. 1 is a schematic diagram of a system for implementing an electronic wish list system as described herein, according to some embodiments.

Wish list systems, user interfaces, and methods are described that provide a consumer a way to create, manage, and fulfill an electronic wish list.

As described in further detail below, in some embodiments, an electronic wish list owner can use an electronic wish list system to capture and manage electronic wish lists for a plurality of electronic wish list creators.

In some embodiments, an electronic wish list system can replace a paper wish list. In some embodiments, an electronic wish list system enables an electronic wish list owner to conveniently manage one or more electronic wish lists together. In some embodiments, the wish list owner can purchase one or more of the items when managing the one or more electronic wish lists. In some embodiments, when purchasing one or more of the items, a discount or other incentive can be displayed. In some embodiments, the electronic wish list owner can review how many items have been purchased from an electronic wish list, how much money has been spent on a particular electronic wish list, or the like.

In some embodiments, an electronic wish list system enables an electronic wish list creator to create an electronic wish list in a game-like environment. The electronic wish list creator can review a plurality of items available from a retail organization and add one or more of the items to the electronic wish list. The electronic wish list creator can share the electronic wish list via an electronic message.

In some embodiments, an electronic wish list system enables an electronic wish list creator to create an electronic wish list in an environment that is not game-like. The electronic wish list creator can review a plurality of items available from a retail organization and add one or more of the items to the electronic wish list. The electronic wish list creator can share the electronic wish list via an electronic message. In some embodiments in which the environment is not game-like, a game-experience within the application can be provided to the user. In some embodiments, a theme of the game within such an environment may be based, for example, on a theme of the application (e.g., holiday themed, birthday themed, etc.).

In some embodiments, an electronic wish list owner can share all or a portion of the one or more electronic wish lists. The electronic wish list owner can share the one or more electronic wish lists via any means, including, but not limited to, via one or more social networks, text message, electronic mail message, or the like.

In some embodiments, the electronic wish lists can be associated with one or more gift registry systems of a retail organization. In such embodiments, a consumer may be able to purchase one or more items from an electronic wish list either in a retail store or on a retail website of the retail organization and the electronic wish list can be updated to indicate that the item has been purchased.

In some embodiments, an electronic wish list creator can add an item to her electronic wish list by scanning a bar code or other image in a retail store of the retail organization. The term scan or scanning may also be used to refer to the use of a camera on a user device to capture a photograph or video of a barcode, a QR code, or the like, on a product or in a product advertisement in order to read the barcode or QR code.

In some embodiments, an electronic wish list creator can add an item to her electronic wish list by using a finger to touch (or hover over) an item of interest. In such embodiments, a display of the user's device and an input may be the same.

In some embodiments, the electronic wish list creator can add an item to her electronic wish list using a mobile device such as, but not limited to, a smartphone or tablet device. In some embodiments, the electronic wish list owner can manage an electronic wish list within her account using a mobile device, a personal computer (PC), a laptop computer, or the like.

In some embodiments, an electronic wish list creator can use a camera on a mobile device, such as, but not limited to, a smartphone or tablet device, to capture an image of the advertisement using an application that resides on the mobile device. Some or all of the images of products appearing in the advertisement can be identified from the advertisement. The identified images can be made selectable to the electronic wish list creator via the display screen of the mobile device to enable the user to add one or more of the products to her electronic wish list.

In some embodiments, the advertisement can be from a retail store or other retailer, from a wholesaler, or from any other entity that offers products for sale. The advertisement can be any type of advertisement that advertises products including, but not limited to, printed advertisements appearing in newspapers, catalogs, magazines, circulars, mailers, and the like, an in-store advertisement, non-printed advertisements appearing on a website, or any other advertisement. In some embodiments, the advertisement that a user can interact with may be limited to one of the preceding. For example, in some embodiments, a user may be able to scan products from a catalog. In some embodiments, the advertisement can be of any type so long as the advertisement can be imaged by a camera on a mobile device.

The products appearing in the advertisement can be products that are also available for sale within a retail store, for sale online (e.g., on a website of a retail store), or that are available for purchase via any other sales channel. In some embodiments, some or all of the products in the advertisement need not be for sale. Instead, some or all of the products appearing in the advertisement could be for promotional or other purposes that are intended to permit the user to learn more about the product, but not necessarily to permit the user to purchase the product.

An electronic wish list, as used herein, generally refers to a desired list of products. In some embodiments, an electronic wish list or electronic wish list of products can be the same as or similar to a shopping list of products. An electronic wish list can be used for any of a variety of important events. Examples of electronic wish lists include, but are not limited to, a holiday electronic wish list, a birthday electronic wish list, or the like. An electronic wish list is generally made publicly available, or semi-publicly available (e.g., only to family and/or friends of an electronic wish list creator). An electronic wish list can be managed by a retailer, such that an electronic wish list owner can create an electronic wish list of products that family and friends can then purchase. The electronic wish list owner may also be able to purchase products from the electronic wish list. In some embodiments, the electronic wish list owner may be able to purchase the products while reviewing the electronic wish list. In some embodiments, the electronic wish list owner may be able to select one of the items for further review and then purchase the item. The electronic wish list owner and all parties with access to the electronic wish list can view what has and what has not been purchased from the electronic wish list. An electronic wish list may be referred to as a wish list throughout.

An electronic wish list owner, as used herein, is a consumer who manages one or more electronic wish lists created by one or more wish list creators. An electronic wish list owner may alternatively be referred to as an electronic wish list manager or the like. In some embodiments, the electronic wish list owner may be, for example, a parent or guardian of one or more children. An electronic wish list owner may be referred to as a wish list owner throughout.

An electronic wish list creator, as used herein, is a consumer who compiles an electronic wish list. In some embodiments, an electronic wish list creator may be, for example, a child or dependent of an electronic wish list owner. An electronic wish list creator may be referred to as a wish list creator throughout.

FIG. 1 is a schematic diagram of a system 10 for implementing the user interfaces, electronic wish system, and methods described herein, according to some embodiments. In the system 10, a server 16 is connected in communication with a user device 12 via a network 14.

The server 16 can make a graphical user interface (GUI) available to the user device 12. The server 16 can make the GUI available over the network 14 according to principles known in the art suitable for allowing a user to access and view the GUI with the user device 12. In some embodiments, aspects of the server 16 can be the same as or similar to aspects of server device 535 as described in accordance with FIG. 11 below. An application can be loaded onto the user device 12 that can include one or more features of the server 16. For example, the application can make the GUI available to the user device 12, according to some embodiments. Further, in some embodiments, the application can include a database of products, information about one or more electronic wish lists, or the like, such that the information does not need to be obtained over the network 14 from the server 16.

In some embodiments, the network 14 can generally represent the Internet. In some embodiments, the network 14 can include, for example, a local area network (LAN), a wide area network (WAN), a wireless network, a cellular data network, or the like. In some embodiments, aspects of the network 14 can be the same as or similar to aspects of network 540 as described in accordance with FIG. 11 below.

A wish list owner and/or a wish list creator can create and/or manage one or more electronic wish lists by accessing an electronic wish list system via the user device 12. Examples of the user device 12 include, but are not limited to, a personal computer (PC), a laptop computer, a mobile device (e.g., a smartphone, a personal digital assistant (PDA), a tablet-style device, etc.), or the like. A GUI of the electronic wish list system is displayed on a display of the user device 12. Examples of the display for the user device 12 include, but are not limited to, a monitor connected to a PC, a laptop screen, a mobile device screen, a tablet screen, or the like. In some embodiments, aspects of the user device 12 can be the same as or similar to aspects of user devices 501 as described in accordance with FIG. 11 below. It is to be appreciated that portions of the functionality may be specifically designed to be accessible via one type of user device 12, but not from another type of user device 12. For example, as described in further detail below, a wish list creator may generally be able to create an electronic wish list from a mobile device or a tablet-style device, but may not be able to create the electronic wish list via a PC device.

The server 16 is in communication with a database 20. The database 20 generally includes a variety of information on products available from a retailer, such as a product database 20A. In some embodiments, the products may be those products that are available from a particular catalog, such as, but not limited to, a Holiday Season toy catalog, or the like. In some embodiments, the products may be those products that are available from the retailer, either through the retailer's website or in a retail store of the retailer. The database 20 also includes information related to specific wish lists, such as a wish list database 20B. The wish list database 20B can store information about a wish list owner's electronic wish lists, such as, but not limited to, a number of electronic wish lists, a product listing contained within each electronic wish list, which products are identified as favorites on each electronic wish list, a relative ranking between the products with each electronic wish list, which products have been purchased from each electronic wish list, or the like.

The server 16 can be in communication with a social network 18 via the network 14. In some embodiments, the social network 18 can include reviews for one or more products that are in the product database 20A. The server 16 can make these product reviews available to the GUI on the user device 12 such that the GUI can display reviews of a product to a wish list owner. In some embodiments, a wish list creator may be able to see reviews of a product as well.

In some embodiments, the wish list owner can share one or more electronic wish lists or one or more portions of one or more electronic wish lists via the social network 18. Examples of the social network 18 include, but are not limited to, Google+, Pinterest, Facebook, Instagram, Twitter, or the like.

Figure 2:
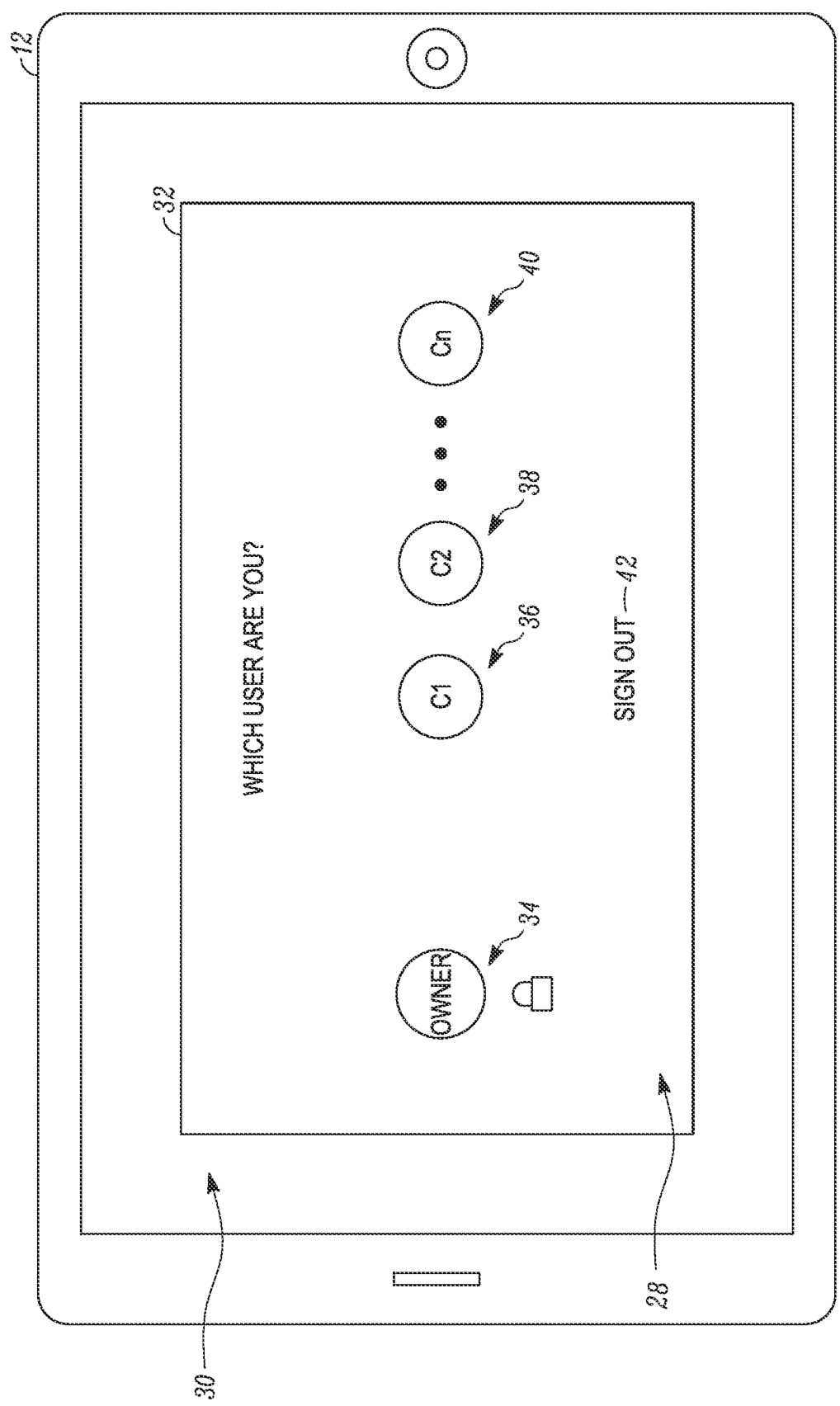
FIG. 2 illustrates an initialization user interface for the electronic wish list system as described herein, according to some embodiments.

FIG. 2 illustrates an initialization GUI 28 for the electronic wish list system as described herein, according to some embodiments. The initialization GUI 28 is generally representative of a starting/entry point for a user of the electronic wish list system, as described herein. The initialization GUI 28 may generally be the starting/entry point of the electronic wish list system regardless of whether the user is a wish list owner or a wish list creator. A wish list owner generally has to register within the electronic wish list system prior to accessing the initialization GUI 28. The registration process is not intended to be limiting and generally functions according to principles known in the art. For example, the registration process generally includes a user either logging in with an account for the retail organization or creating a new account. It is to be appreciated that the text, arrangement of the text, images, and the like, are intended to serve as examples for the initialization GUI 28 and can vary according to principles described herein.

The initialization GUI 28 is displayed on a display 30 of the user device 12. The initialization GUI 28 includes a message window 32. The message window 32 can be, for example, a popup window that is overlaid on top of a background (e.g., a background can be another GUI, a combination of images, text, or the like). Generally, the initialization GUI 28 can be loaded when the electronic wish list system is loaded onto the user device 12. The initialization GUI 28 enables a user to select which user she is. Selecting which user can accordingly identify which type of interactions the user will have within the application. That is, selecting the user can be an indication as to whether the user is an electronic wish list owner or an electronic wish list creator. In the illustrated embodiment there is a single wish list owner (identified as "OWNER" in button 34). It is to be appreciated that there may be one or more additional wish list owners, and that each of the one or more additional wish list owners can be represented by an additional button 34 in such scenarios. The button 34 is representative of an electronic wish list owner, and includes a padlock symbol to indicate that a password is required if selecting the wish list owner button 34. Buttons 36, 38, 40 are selectable to indicate that the user is a wish list creator. Each of the buttons 36, 38, 40 correspond to a different wish list creator, and accordingly to a different electronic wish list. In some embodiments, the wish list owner can be a parent/guardian and the wish list creators can be children of the parent/guardian. The user can select to sign out with a link 42 to exit the electronic wish list system.

Figure 3:
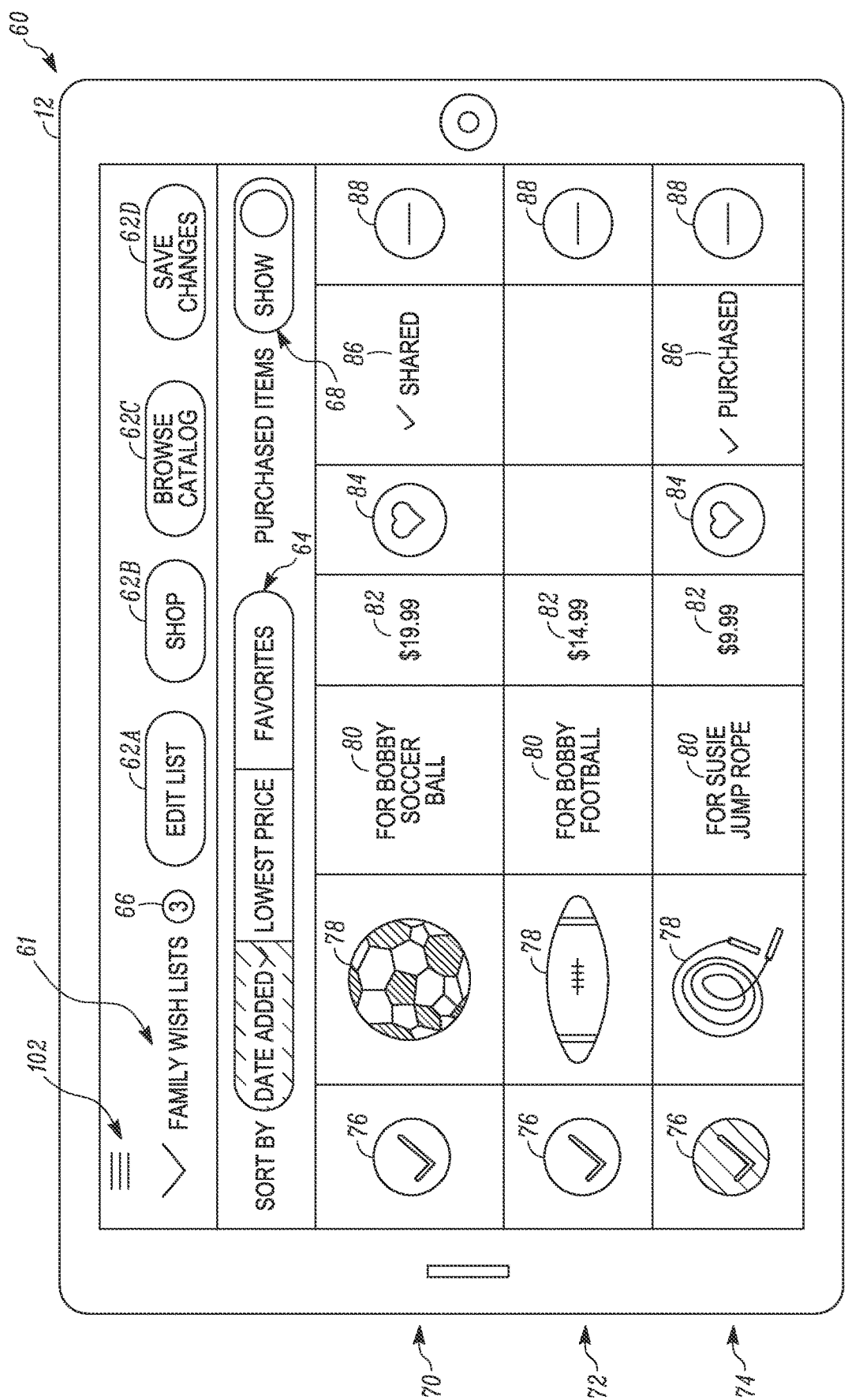
FIG. 3 illustrates an electronic wish list management user interface for the electronic wish list system as described herein, according to some embodiments.

FIG. 3 illustrates an electronic wish list management GUI 60 for the electronic wish list system as described herein, according to some embodiments. The electronic wish list management GUI 60 is representative of a GUI for an electronic wish list owner. Accordingly, if a user selects the button 34 (FIG. 2) and successfully authenticates as the electronic wish list owner, she is presented with the electronic wish list management GUI 60. It is to be appreciated that the text, arrangement of the text, images, and the like, are intended to serve as examples for the electronic wish list management GUI 60 and can vary according to principles described herein.

The electronic wish list management GUI 60 includes a listing of the various items added into each electronic wish list by the one or more wish list creators associated with the wish list owner's account. In an embodiment in which the wish list owner is a parent/guardian and the wish list creators are the parent/guardian's children, the items illustrated represent the items each of the children have added to her individual electronic wish list. As illustrated, the wish list owner can view the wish list items corresponding to all electronic wish lists in the wish list owner's account. In some embodiments, the wish list owner can select a wish list filter 61 to select which of the electronic wish lists are displayed. For example, the wish list owner can select to display all items from all of the wish list creators in the wish list owner's account. Alternatively, the wish list owner could select a particular electronic wish list corresponding to one of the wish list creators in the wish list owner's account.

The electronic wish list management GUI 60 includes a plurality of buttons 62A-62D. Each of the wish list buttons 62A-62D provide a different function to the wish list owner for managing the various electronic wish lists within the wish list owner's account. The wish list owner can select button 62A to edit an electronic wish list. When the wish list owner selects button 62A, the wish list owner may be able to edit any of the electronic wish lists currently being displayed, according to some embodiments. This can enable the wish list owner to add items that one or more of the wish list creators may have mentioned but did not include on her electronic wish list. In some embodiments, this may also enable the wish list creator to remove items, select an item as a favorite, remove an item from being a favorite, or the like. In some embodiments, this may also enable the wish list creator to modify a relative ranking of the items (e.g., a more desired item being listed first, with less desired items following, etc.). The wish list owner can select button 62B in order to shop for one or more items through the retailer's website. In some embodiments, the one or more items in the electronic wish list may be purchasable directly from the electronic wish list management GUI 60. This can, for example, enable the wish list owner to purchase one or more items corresponding to the electronic wish lists. The wish list owner, however, is not limited to shopping only for those items included on the electronic wish lists. In some embodiments, the button 62B may direct the wish list owner to the retailer's website, while in other embodiments, the application may be configured to load a shopping GUI (not shown). In some embodiments, the wish list owner may be able to directly purchase one or more of the items included on the electronic wish list when reviewing the electronic wish list in the electronic wish list management GUI 60. The wish list owner can select button 62C in order to browse the retailer's catalog. The button 62C can correspond to a particular catalog for which the application was designed. For example, the button 62C can cause a particular catalog, e.g., a holiday season toy catalog or the like, to be displayed and reviewable to the wish list owner. The wish list owner can select button 62D to save changes made to the electronic wish lists.

The electronic wish list management GUI 60 can be configured to display items in different ways. A sort option 64 is selectable to modify how the wish list items are displayed for the wish list owner. For example, the wish list owner can sort the items by the date added, the lowest price, or by whether the item is a favorite. As illustrated, when a particular sort option 64 is selected, the option can be highlighted (e.g., by changing color, or the like), as represented by cross-hatching of the "Date Added" option in FIG. 3. The wish list owner can also select to show or hide purchased items by her selection of a purchased items display toggle 68.

Three items 70, 72, 74 are illustrated. The three items 70, 72, 74 represent items from one or more electronic wish lists corresponding to the wish list owner's account. Each item 70, 72, 74 includes a variety of information about the particular wish list item 70, 72, 74. An indicator 76 identifies whether an item has been purchased or not. The indicator 76 can be highlighted when an item is purchased to visually indicate to the wish list owner that a product has been purchased. For example, the indicator 76 includes cross-hatching to represent highlighting that item 74 has been purchased. A product image 78 is displayed representing the item. A description 80 is included that identifies to whose electronic wish list the item corresponds (e.g., for Bobby, for Susie, or the like) and a description of what the item is. A price 82 is also displayed for the item. A favorite indicator 84 is included to indicate whether this item was selected as one of the wish list creator's favorite items. In some embodiments, the favorite indicator 84 may be shown if selected as a favorite (e.g., items 70, 74) or not shown if the item (e.g., item 72) is not selected as a favorite. In some embodiments, all items can include a favorite indicator 84 that can be highlighted when selected as a favorite and can function similar to the indicator 76. In some embodiments, the favorite indicator 84 can include a scale. For example, instead of being a single heart as shown in the illustrated embodiment, the favorite indicator 84 can be a plurality of hearts (or other indicator) to provide a scale as to how desired the particular item is. For example, a wish list creator could indicate that a particular item has three out of five hearts in favorite indicator 84, while another particular item has one out of five hearts in favorite indicator 84, thereby establishing that the wish list creator desires the particular item with three hearts more than the particular item with one heart. The wish list owner can, in some embodiments, edit the favorite indicator 84 to increase the relative desire for the item, decrease the relative desire for the item, or remove the item as a favorite altogether. A status indicator 86 can display a message as to whether any action has been taken with regard to the item (e.g., whether the wish list owner has shared the item, or whether the item has been purchased, or the like). A delete button 88 is included to enable the wish list owner to delete an item. It is to be appreciated that there may be one or more other options selectable to the wish list owner. For example, a wish list owner can, in some embodiments, display how many items have been purchased for a particular wish list creator, a total dollar amount of purchased items for a particular wish list creator, or the like.

In some embodiments, a purchase button (not shown) which enables the wish list owner to purchase an item directly from the electronic wish list management GUI 60. For example, in some embodiments, the electronic wish list management GUI 60 can include an "Add to Cart" button which enables the wish list owner to add a particular item to her cart. In some embodiments, the items 70, 72, 72 may be selectable such that the wish list owner can review more details about the item and add the item to the wish list owner's cart if so desired.

Figure 4:
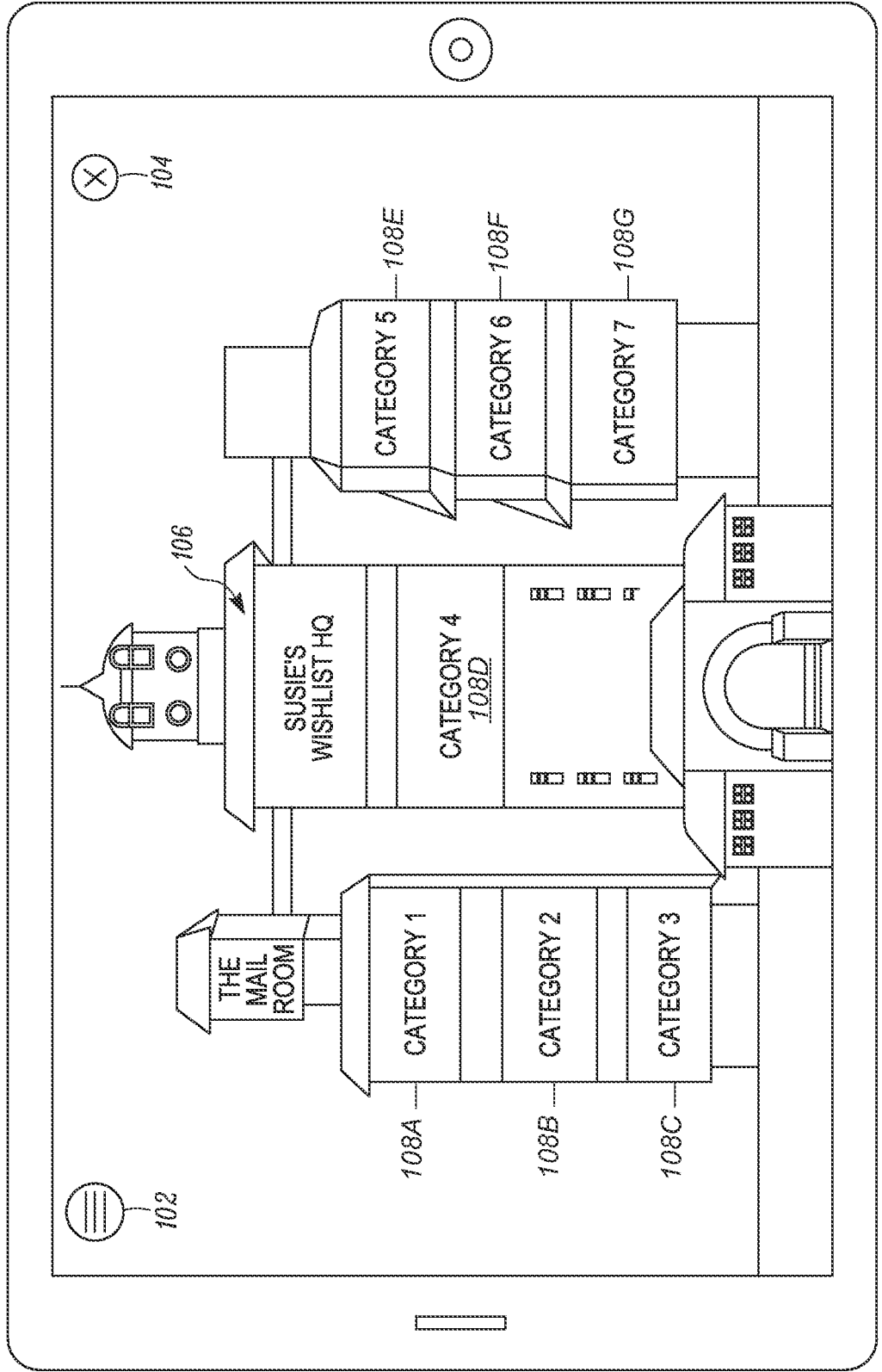
FIG. 4 illustrates an electronic wish list category user interface for the electronic wish list system as described herein, according to some embodiments.

FIG. 4 illustrates an electronic wish list category GUI 100 for the electronic wish list system as described herein, according to some embodiments. The electronic wish list category GUI 100 corresponds to a GUI displayed for a wish list creator, according to some embodiments. It is to be appreciated that the text, arrangement of the text, images, and the like, are intended to serve as examples for the electronic wish list category GUI 100 and can vary according to principles described in this specification.

The electronic wish list category GUI 100 includes menu options 102 and an exit option 104. The wish list creator can select the menu options 102 to, for example, to turn off music, change the wish list creator's character/avatar, review the instructions, or quit the application. The exit option 104 enables the wish list creator to exit the application. In some embodiments, selecting the exit option 104 can exit the application. In other embodiments, selecting the exit option 104 can, for example, return the wish list creator to the initialization GUI 28.

The electronic wish list category GUI 100 can be customized for a particular wish list creator. For example, message 106 can include the wish list creator's name identifying the electronic wish list category user interface 100 as corresponding to that particular wish list creator.

Figure 5:
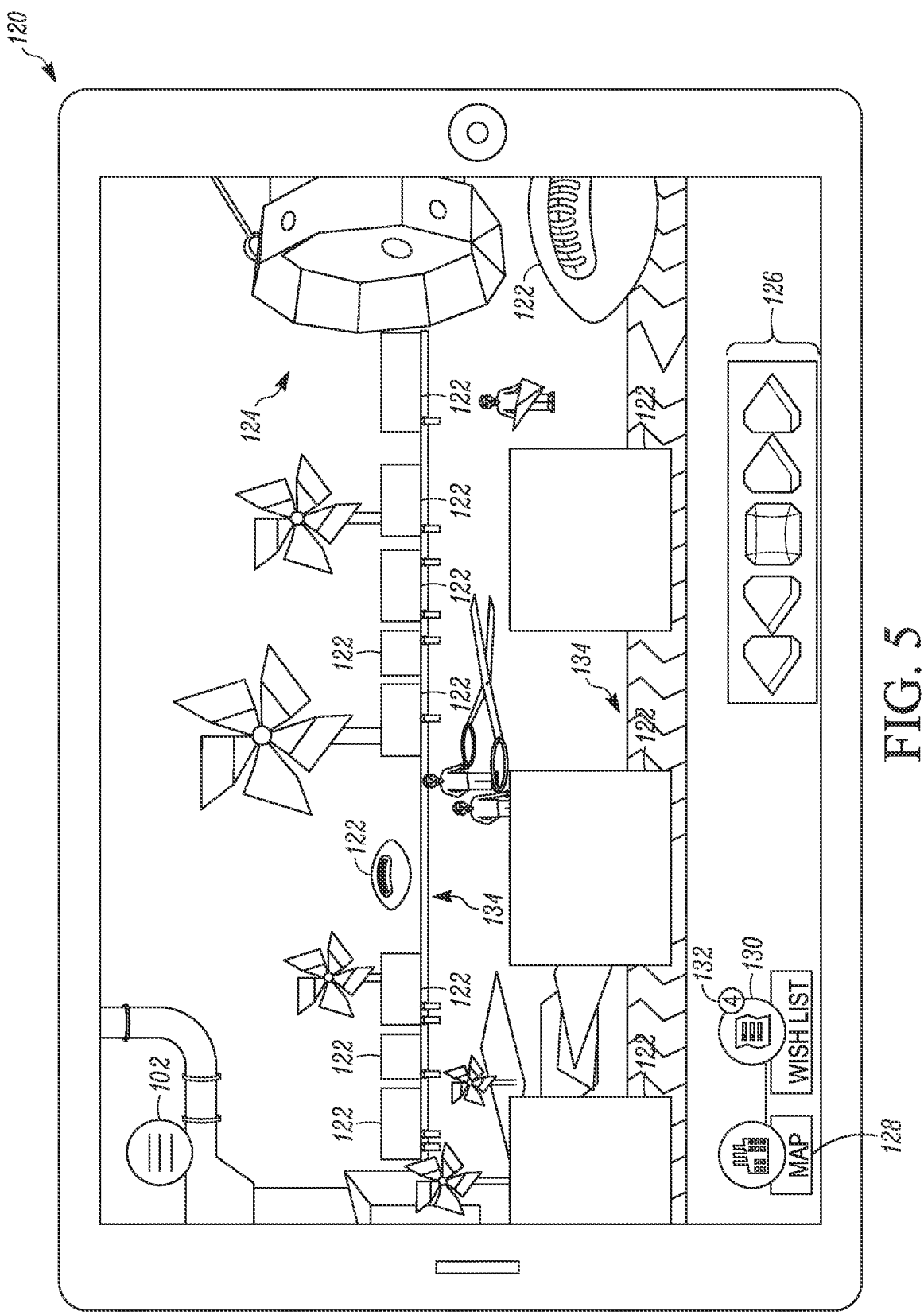
FIG. 5 illustrates an electronic wish list building user interface for the electronic wish list system as described herein, according to some embodiments.

The electronic wish list category user interface 100 includes a plurality of category options 108A-108G. The category options 108A-108G are generally selectable such that a wish list creator can view one or more items from the category selected. For example, if the wish list creator selects category option 108A (e.g., Category 1), the wish list creator begins the electronic wish list creation process via the electronic wish list building GUI 120 (FIG. 5). The items that the wish list creator will see in the electronic wish list building GUI 120 will correspond to items selected from Category 1. Further, the look and feel of the electronic wish list building GUI 120 may be dependent upon the selection in the electronic wish list category GUI 100. In some embodiments, the category options 108A-108G may correspond to categories of products in a catalog of the retailer. It is to be appreciated that there can be fewer or additional category options 108A-108G. Examples of category options include, but are not limited to, Tech Toys, Games, or the like.

FIG. 5 illustrates an electronic wish list building GUI 120 for the electronic wish list system as described herein, according to some embodiments. The electronic wish list building GUI 120 is one manner in which a wish list creator can identify products to add to the wish list creator's electronic wish list. In some embodiments, the electronic wish list building GUI 120 may not be accessible to the wish list owner. In some embodiments, the electronic wish list building GUI 120 may be accessible from a mobile device, such as, but not limited to, a smartphone or a tablet-style device.

The electronic wish list building GUI 120 includes a game-like environment in which a wish list creator can identify and select items to be added to her electronic wish list. It is to be appreciated that the text, arrangement of the text, images, and the like, are intended to serve as examples for the electronic wish list building user interface 120 and can vary according to principles described herein. It will be appreciated that in some embodiments, the game-like environment of the electronic wish list building GUI 120 can be provided without a tie-in to the electronic wish list building feature. That is, in some embodiments, the game-like environment can be played without items being added to a wish list creator's wish list. In such embodiments, the game-like environment may be an alternative option to the wish list building for the wish list creator.

In the illustrated embodiment, the electronic wish list building GUI 120 includes a plurality of items 122 cycling into and out of the wish list creator's view via a conveyor belt 134. The items 122 represent the various items within the category selected by the wish list creator. The items 122 can be selected by the wish list creator by, for example, using a finger to touch (or hover over) the item 122 of interest and dragged into the wish list selection tube 124. In some embodiments, a stylus or other similar device can be used for selecting the item 122 of interest on a touchscreen. As an item is added to the wish list selection tube 124, a confirmation message (not shown) may be displayed for the user. In some embodiments, a confirmation sound, vibration, or the like may be played for the user. As the user selects an item, the wish list item count 132 is incremented.

Figure 6:
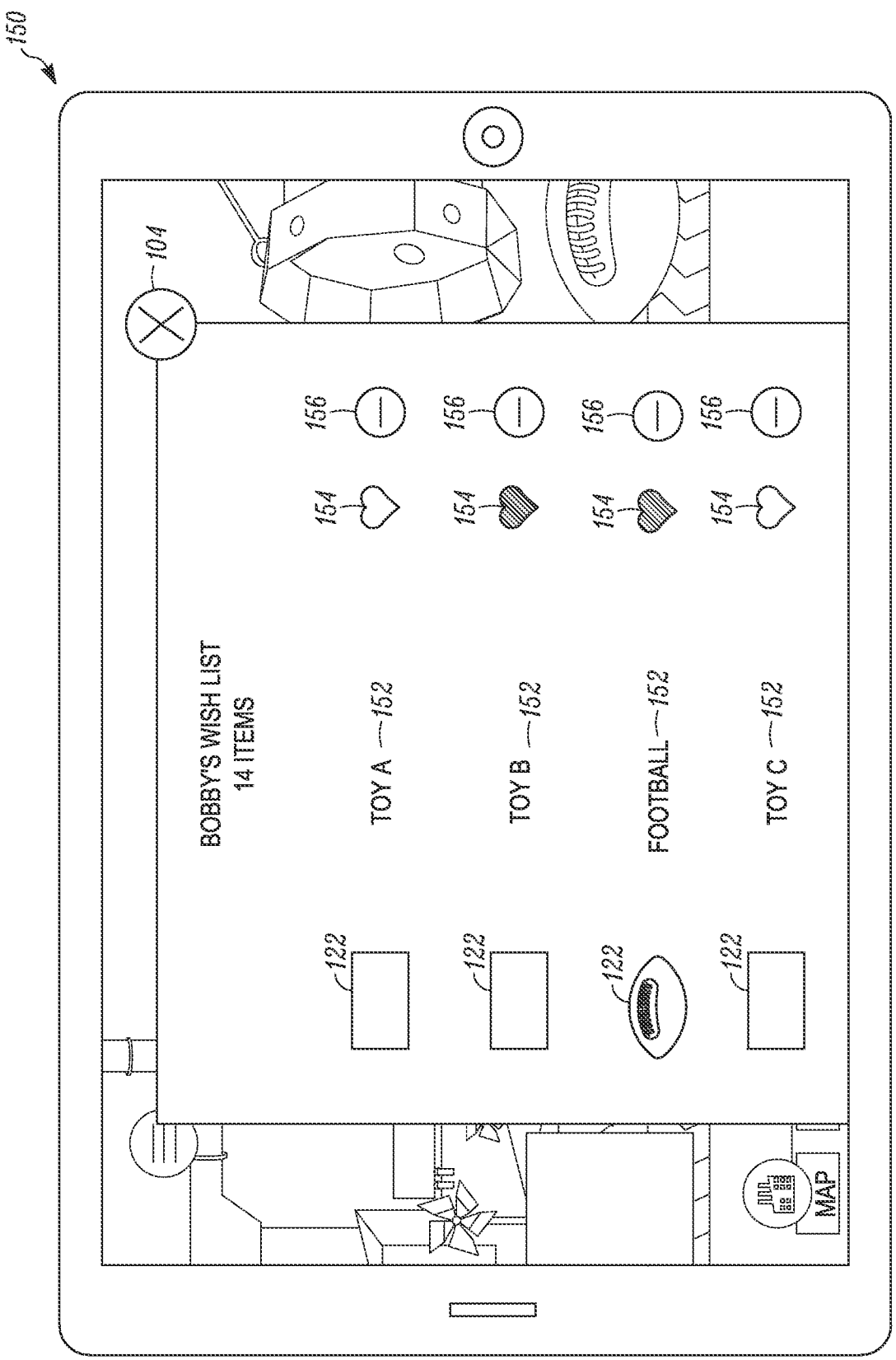
FIG. 6 illustrates an electronic wish list review user interface for the electronic wish list system as described herein, according to some embodiments.

The wish list creator can select to review her electronic wish list by selecting wish list button 130. Selecting the wish list button 130 can direct the user to an electronic wish list review user interface 150 (FIG. 6). The wish list creator can control the speed of the conveyor belt 134 with the buttons 126 (e.g., speed up, slow down, stop, or the like). The wish list creator can select map button 128 in order to return to the electronic wish list category GUI 100 to select a different category of items. In some embodiments, the wish list creator can select an item and a message is displayed asking if the wish list creator would like to add the item to her electronic wish list.

FIG. 6 illustrates an electronic wish list review GUI 150 for the electronic wish list system as described herein, according to some embodiments. The electronic wish list review GUI 150 enables a wish list creator to manage her electronic wish list. When the wish list creator selects to review her electronic wish list, she can see which items are currently included in her electronic wish list, add/remove a favorite for an item, and/or delete an item. The illustrated embodiment shows four different products in the particular electronic wish list. As indicated at the top of the electronic wish list review GUI 150, the wish list creator's electronic wish list contains 14 items. Accordingly, the electronic wish list review GUI 150 can be scrollable so that the wish list creator can review each of the items included in the electronic wish list. If the wish list creator selects the exit option 104, she may return to the electronic wish list building GUI 120, according to some embodiments.

The electronic wish list in the electronic wish list review GUI 150 includes a product image 122, a product description 152, a favorite indicator 154, and a delete button 156. The wish list creator can review the items added into the electronic wish list and provide an indication that a particular item is a favorite with item by selecting favorite indicator 154 or deleting an item with the delete button 156. In some embodiments, the favorite indicator 154 can change in appearance when selected to visually indicate whether the item was selected as a favorite. For example, the cross-hatching in FIG. 6 corresponds to a visual indication that Toy B and the Football have been identified as favorite items.

Figure 7:
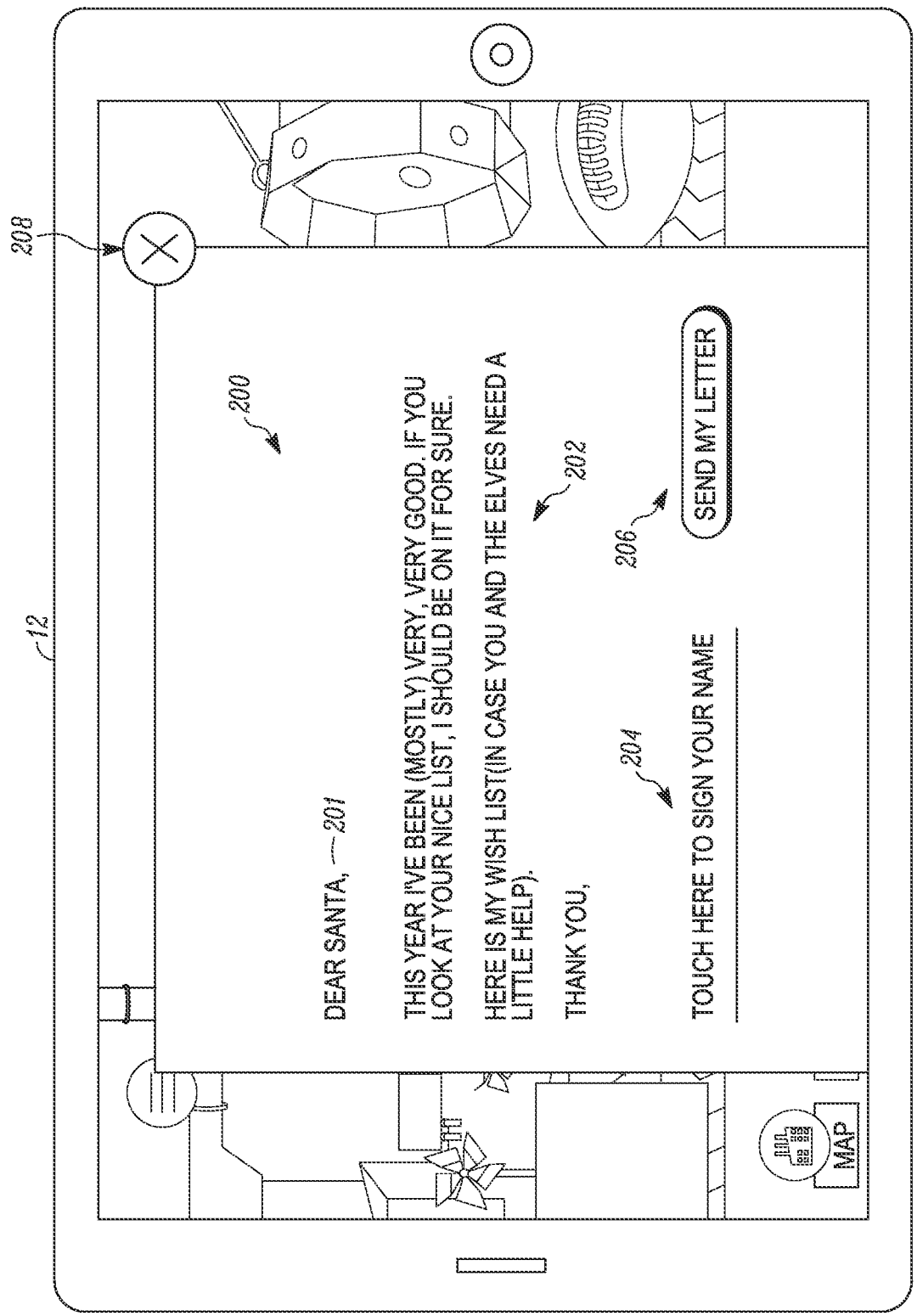
FIG. 7 illustrates an electronic wish list transmission user interface for the electronic wish list system as described herein, according to some embodiments.

FIG. 7 illustrates an electronic wish list sharing GUI 200 for the electronic wish list system as described herein, according to some embodiments. The electronic wish list transmission GUI 200 is generally representative of an electronic message in which a wish list creator transmits her electronic wish list to another. In some embodiments, the electronic wish list message can be sent to the wish list owner. In some embodiments, the electronic wish list message can be sent to a party other than the wish list owner. For example, in the illustrated embodiment, the electronic wish list message is to be transmitted to Santa.

The electronic wish list sharing GUI 200 includes a message greeting 201, an electronic wish list body 202, a signature 204, a transmit button 206, and an exit button 208. The electronic wish list sharing GUI 200 can be configured to meet different occasions.

The wish list creator may be able to select the text in the signature 204 in order to sign her name. Once the wish list creator signs her name she can select transmit button 206 to send the electronic message. In some embodiments, a confirmation GUI (not shown) may be presented to the wish list creator to indicate that the electronic message has been sent. In some embodiments, the wish list owner can receive an indication that the electronic message has been sent in order that the wish list owner is notified that the wish list creator has completed her electronic wish list.

Figure 8:
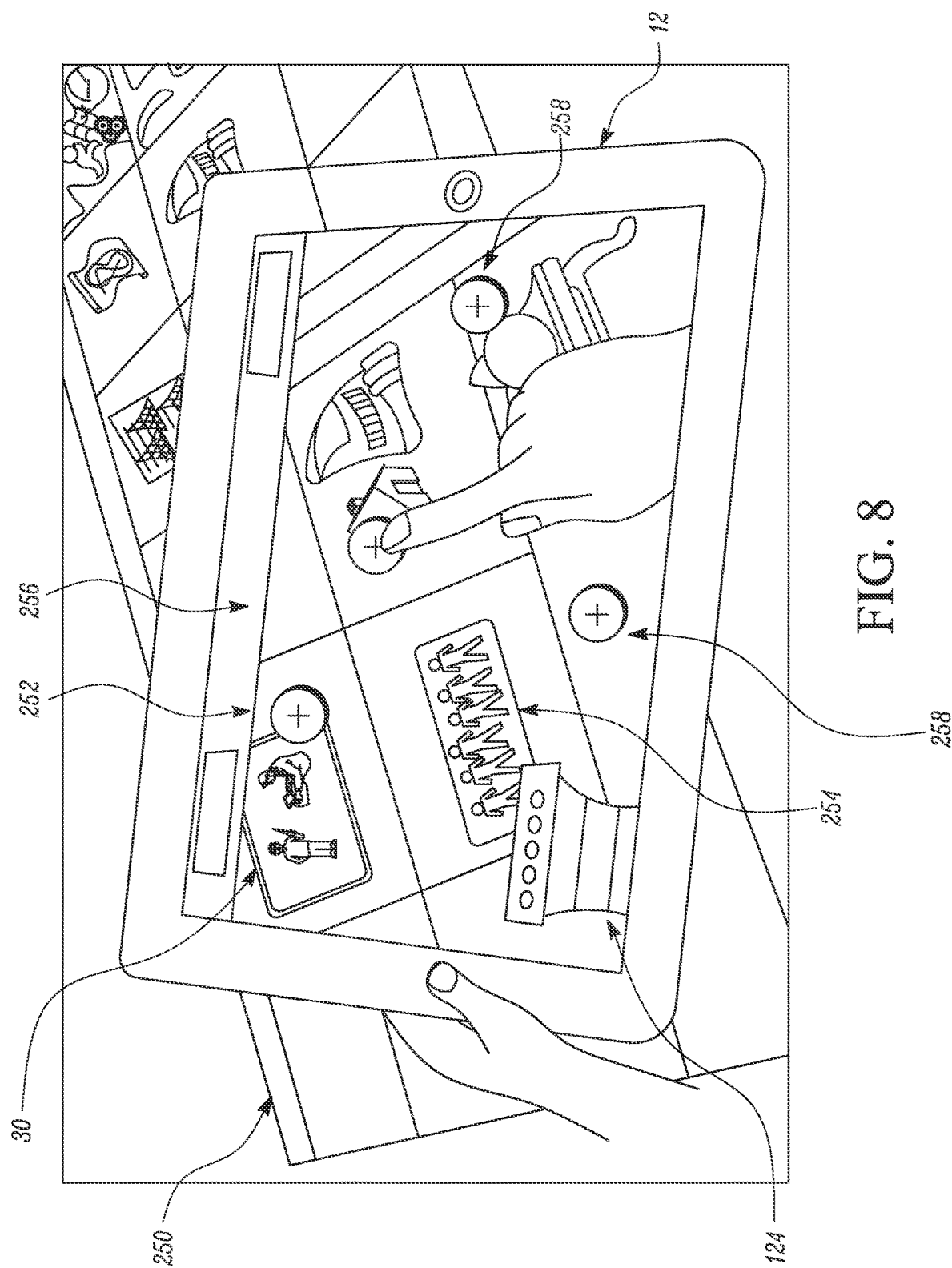
FIG. 8 illustrates an augmented reality user interface for the electronic wish list system as described herein, according to some embodiments.

FIG. 8 illustrates an augmented reality GUI 256 for the electronic wish list system as described herein, according to some embodiments. The augmented reality GUI 256 represents a GUI displayed to a wish list creator, according to some embodiments. Generally, a wish list creator can use the electronic wish list system on the user device 12 to add items from an advertisement viewed on the display 30 of the user device 12. In some embodiments, there can be one or more additional feature of the augmented reality GUI 256. For example, in some embodiments, the wish list creator may see her name imposed on a portion of catalog 250 (not shown). In such embodiments, the augmented reality GUI 256 may appear to be a custom catalog for the particular wish list creator.

In the illustrated embodiment, a portion 252 of a catalog 250 that is within the field of view of the lens of a camera on the user device 12 is displayed on the display 30 of the user device 12. If the camera of the user device 12 includes zoom capability, the zoom setting of the camera can be adjusted so that more or less of the advertisement can be contained within the field of view of the camera. If the wish list creator is interested in products within the advertisement that are not within the current field of view, the wish list creator can simply move the camera until more of the advertisement, or the remainder of the advertisement, is within the camera's field of view.

When a product 254 is in view of the camera, the product may become selectable. When a product is selectable, a select button 258 is added to the product image. In some embodiments, less than all of the products become selectable. In some embodiments, all of the products can be made selectable. Whether a product becomes selectable may be based on whether the application is able to find an image within its library of images that matches the image being viewed by the camera. When a product is selectable, the wish list creator may be able to select the select button 258 to add the item to the wish list creator's electronic wish list. Alternatively, the wish list creator may drag from the select button 258 to the wish list selection tube 124. Similar to the selection process described in accordance with FIG. 5 above, the wish list creator may be presented with a message or other type of feedback confirming the selection of the product.

Figure 9:
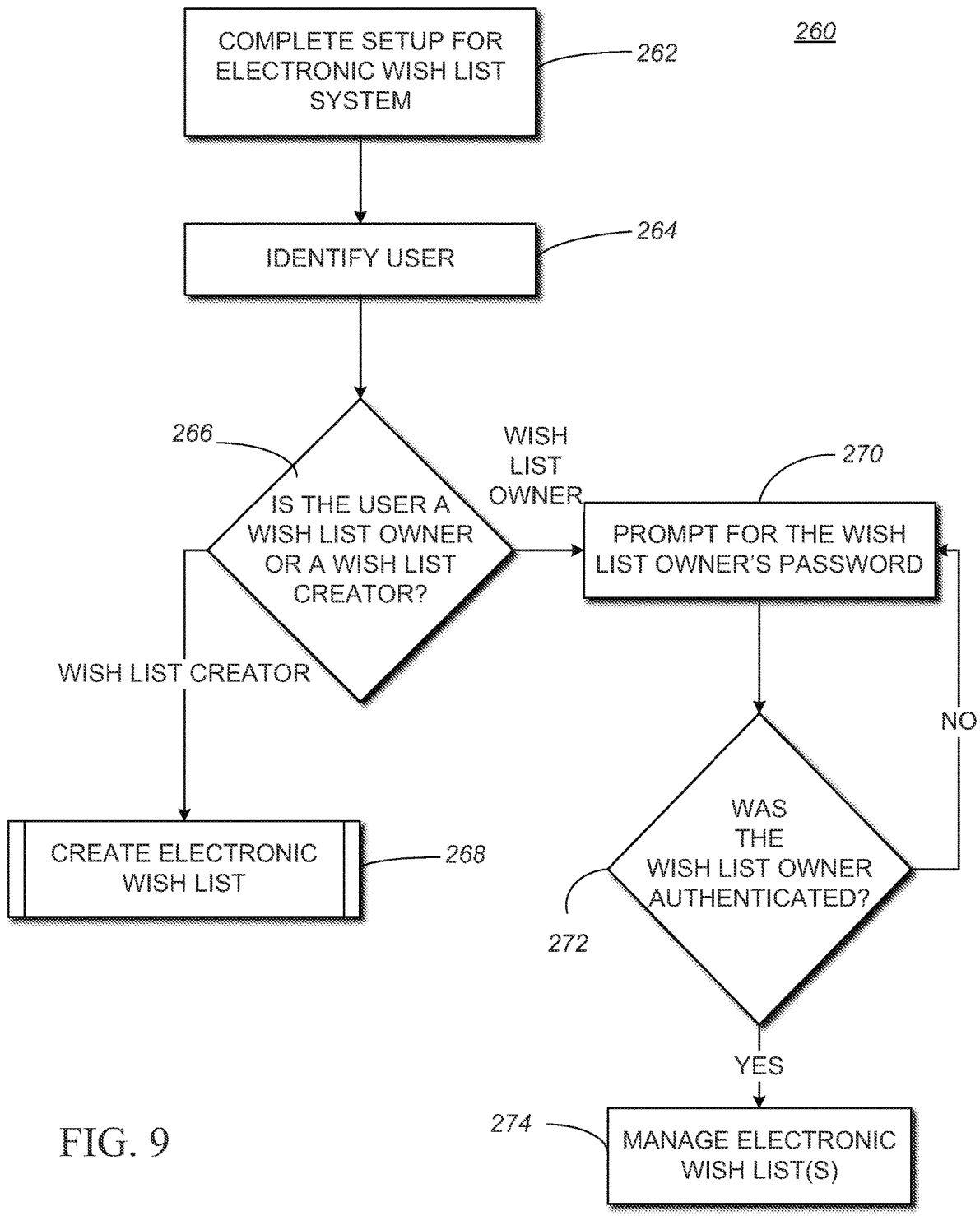
FIG. 9 is a flowchart for a method for using the electronic wish list system as described herein, according to some embodiments.

FIG. 9 is a flowchart for a method 260 for using the electronic wish list system as described herein, according to some embodiments. The method 260 generally illustrates the use of the electronic wish list system by the various types of users.

The method 260 begins at 262 when a user completes setup for an electronic wish list system. In general, the user completing the setup process is a wish list owner. In the setup process, the wish list owner can be prompted to select whether the user has an account with the retail organization. If the wish list owner has an account, the setup process may be shortened to include only setting up the names of one or more wish list creators. If the wish list owner does not have an account, the wish list owner may be prompted to create an account and setting up the names of the one or more wish list creators. In some embodiments, even if the wish list creator does not have an account, the setup process may include setting up the names of the one or more wish list creators without creating an account with the retail organization.

Once the setup process is complete, an initialization GUI (e.g., the initialization GUI 28 of FIG. 2) can be presented to the user and the user can identify which user within the wish list owner's account is using the application at 264. This can include, for example, selecting a username corresponding to the user. In some embodiments this can be the user's name as configured during the setup process. Each username can also be associated with a user type (e.g., electronic wish list owner or electronic wish list creator). At 266 the electronic wish list system determines whether the user selected is a wish list owner or a wish list creator. If the username is identified as a wish list creator, the method 260 continues to 268 and the wish list creator creates an electronic wish list. If, however, the electronic wish list system determines the user selected is a wish list owner, the wish list owner is prompted to enter a password at 270. In some embodiments, the wish list password can be the same as the password for the account created in the setup process (or for the wish list owner's previously owned account with the retail organization). At 272 the electronic wish list system determines whether the wish list owner was authenticated (e.g., entered the proper password). If the wish list owner's password was incorrect the wish list owner is prompted for the wish list owner's password again at 270. If the wish list owner enters the correct password and is accordingly authenticated, the wish list owner may be able to manage the one or more electronic wish lists associated with the wish list owner's account at 274. In some embodiments, managing the one or more electronic wish lists can include a variety of actions. For example, the wish list owner can review the one or more electronic wish lists, add/modify/delete items from the one or more electronic wish lists, or the like. In some embodiments, the wish list owner can share the one or more electronic wish lists with others. Sharing the one or more electronic wish lists can include sharing all or a portion of the electronic wish list. In some embodiments, sharing the one or more electronic wish lists can include sharing the one or more electronic wish lists via any means available (e.g., via one or more social networks, via text message, via an electronic mail message, or the like). In some embodiments, managing the one or more electronic wish lists can include reviewing which items from the electronic wish list have been purchased, how much money has been spent on a particular wish list creator's electronic wish list items, how many items from a particular wish list creator's electronic wish list have been purchased, or the like. A wish list owner may also be able to identify one or more items from the one or more electronic wish lists as a favorite, make one or more notes on a particular item, or the like.

Figure 10:
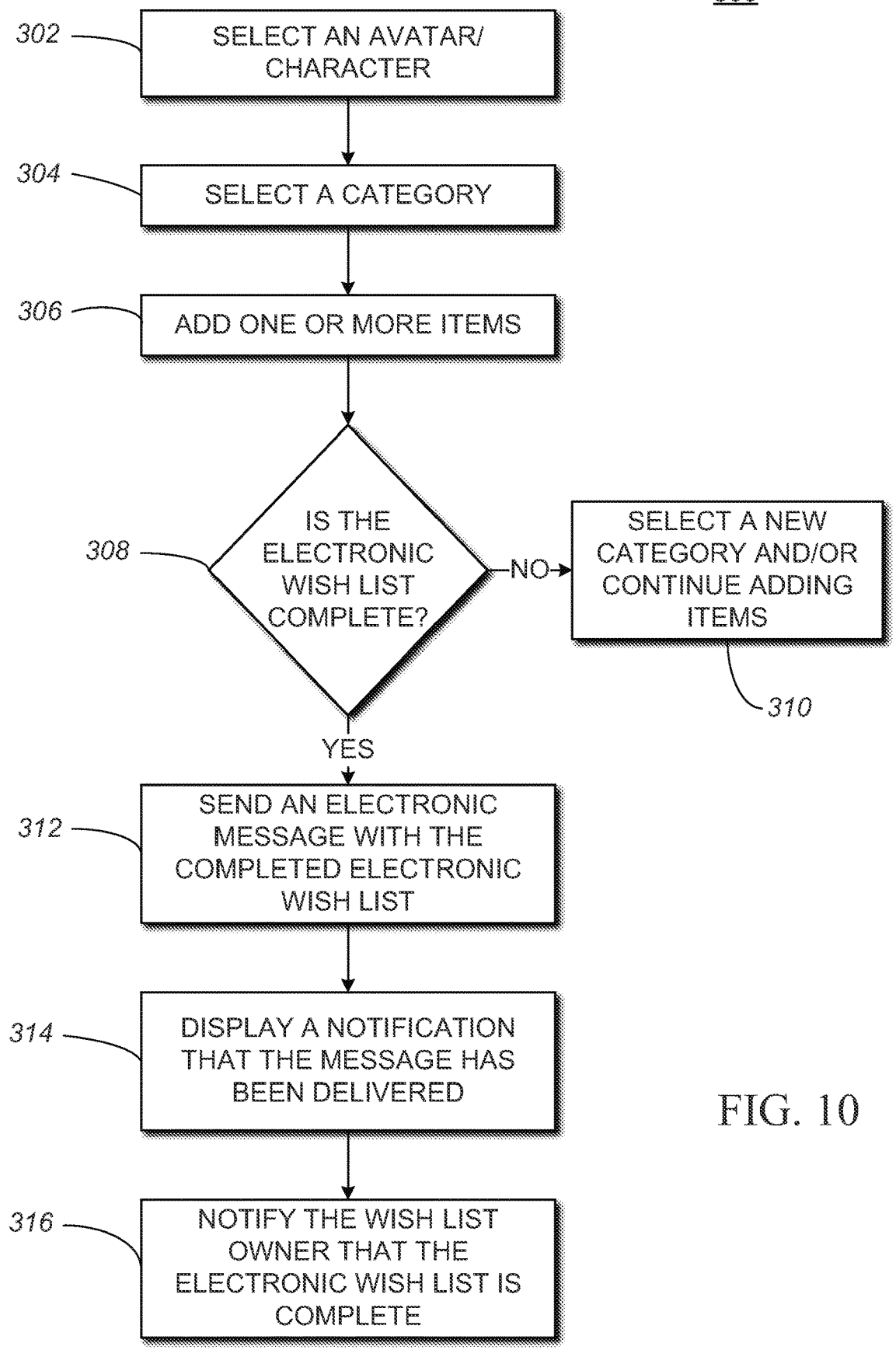
FIG. 10 is a flowchart for a method for creating an electronic wish list using the electronic wish list system as described herein, according to some embodiments.

FIG. 10 is a flowchart for a method 300 for creating an electronic wish list using the electronic wish list system as described herein, according to some embodiments. In general, the method 300 corresponds to a process for a wish list creator to create an electronic wish list to be shared.

The method 300 generally corresponds to creating the electronic wish list of 268 (FIG. 9). Accordingly, the user has already been identified as a particular wish list creator and begins at 302 when the wish list creator selects and/or configures an avatar/character. The avatar/character may be used to identify the wish list creator throughout the electronic wish list creation process. After creating the avatar/ character the wish list creator can select a category of items to browse and consider adding to her electronic wish list at 304. The wish list creator can select the category, for example, at the electronic wish list category GUI 100 (FIG. 4). Once the wish list creator has selected a category at 304, she can add one or more items from the selected category via the electronic wish list building GUI 120 (FIG. 5) at 306. If the electronic wish list is identified as complete at 308, the wish list creator sends an electronic message (e.g., via the wish list sharing GUI 200 of FIG. 7) with the electronic wish list. If, however, the wish list creator does not identify the electronic wish list as complete, the wish list creator selects a new category of items and/or continues adding items from the currently selected category at 310.

After the wish list creator sends the electronic message with the completed electronic wish list at 312, a message is displayed on the wish list creator's user device indicating that the message has been delivered at 314. In addition to displaying the notification to the wish list creator, a notification is sent to the wish list owner indicating that the particular wish list creator's electronic wish list is complete and is ready for review at 316. In some embodiments, the wish list owner may be able to send one or more messages back to the wish list creator. In some embodiments, the wish list owner's identity may not be included in the one or more messages sent back to the wish list creator.

Figure 11:
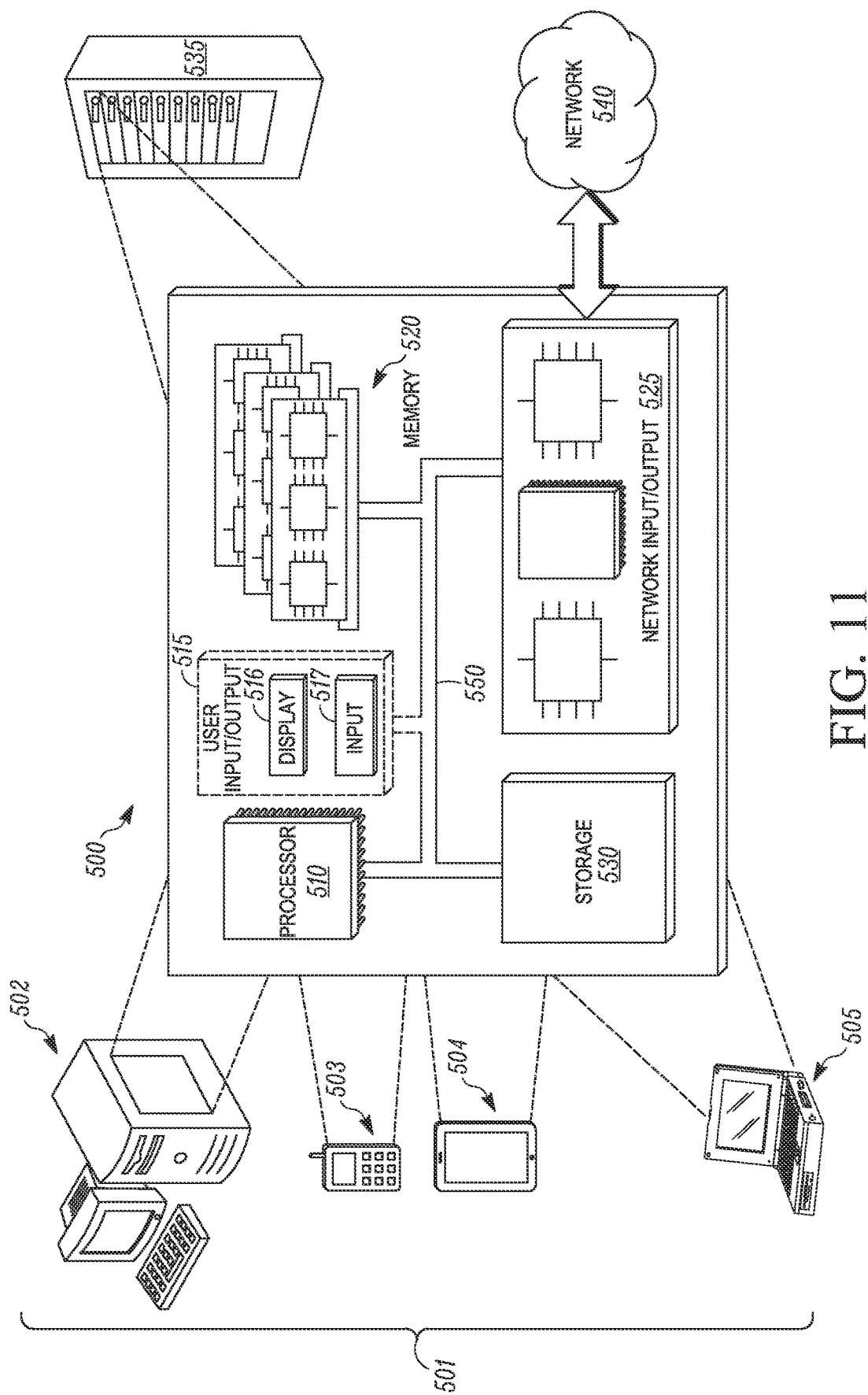
FIG. 11 is a schematic diagram for an architecture for a computing device, according to some embodiments.

FIG. 11 is a schematic diagram of an architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a personal digital assistant (PDA), a video game console, a television, or the like. In some embodiments, the user devices 501 can alternatively be referred to as client devices 501. In such embodiments, the client devices 501 can be in communication with the server device 535 through the network 540. One or more of the client devices 501 can be in communication with another of the client devices 501 through the network 540 in some embodiments.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can, for example, be one or more busses or the like. The processor 510 can be a single processor, multiple processors, or a single processor having multiple processing cores. In some embodiments, the processor 510 can be a single-threaded processor. In some embodiments, the processor 510 can be a multi-threaded processor.

The user I/O 515 can include a display 516 and/or an input 517, according to some embodiments. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In some embodiments, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In some embodiments, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using WiFi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

Figure 12:
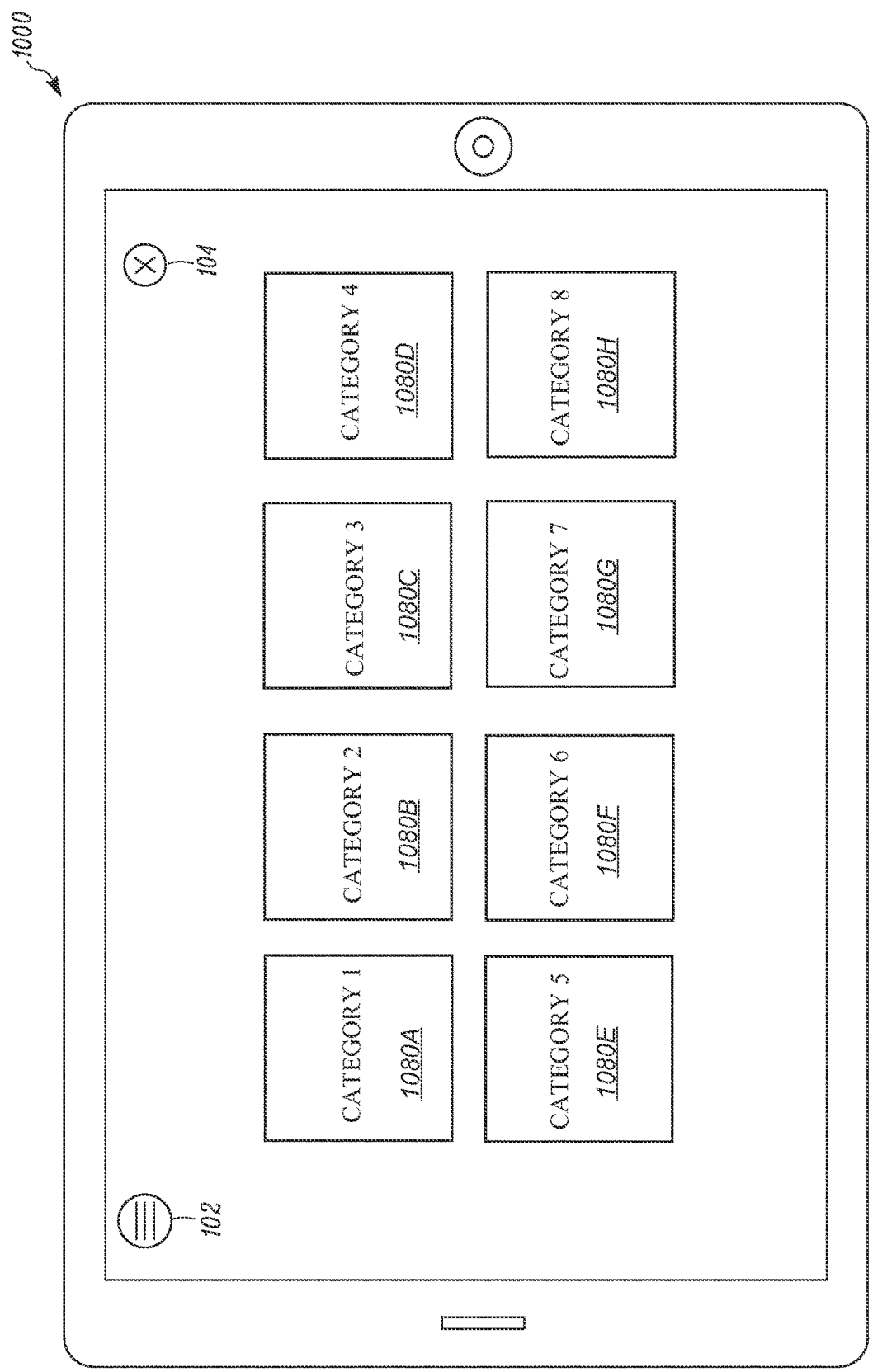
FIG. 12 illustrates an electronic wish list category user interface for the electronic wish list system as described herein, according to some embodiments.

FIG. 12 illustrates an electronic wish list category GUI 1000 for the electronic wish list system as described herein, according to some embodiments. The electronic wish list category GUI 1000 corresponds to a GUI displayed for a wish list creator, according to some embodiments. The GUI 1000 can include aspects that are the same as, or similar to, the GUI 100. It is to be appreciated that the text, arrangement of the text, images, and the like, are intended to serve as examples for the electronic wish list category GUI 1000 and can vary according to principles described in this specification.

The electronic wish list category GUI 1000 includes menu options 102 and an exit option 104. The wish list creator can select the menu options 102 to, for example, to turn off music, change the wish list creator's character/avatar, review the instructions, or quit the application. The exit option 104 enables the wish list creator to exit the application. In some embodiments, selecting the exit option 104 can exit the application. In other embodiments, selecting the exit option 104 can, for example, return the wish list creator to the initialization GUI 28.

The electronic wish list category GUI 1000 can be customized for a particular wish list creator. For example, a message can be displayed on the GUI 1000 that can include the wish list creator's name identifying the electronic wish list category GUI 1000 as corresponding to that particular wish list creator.

Figure 13:
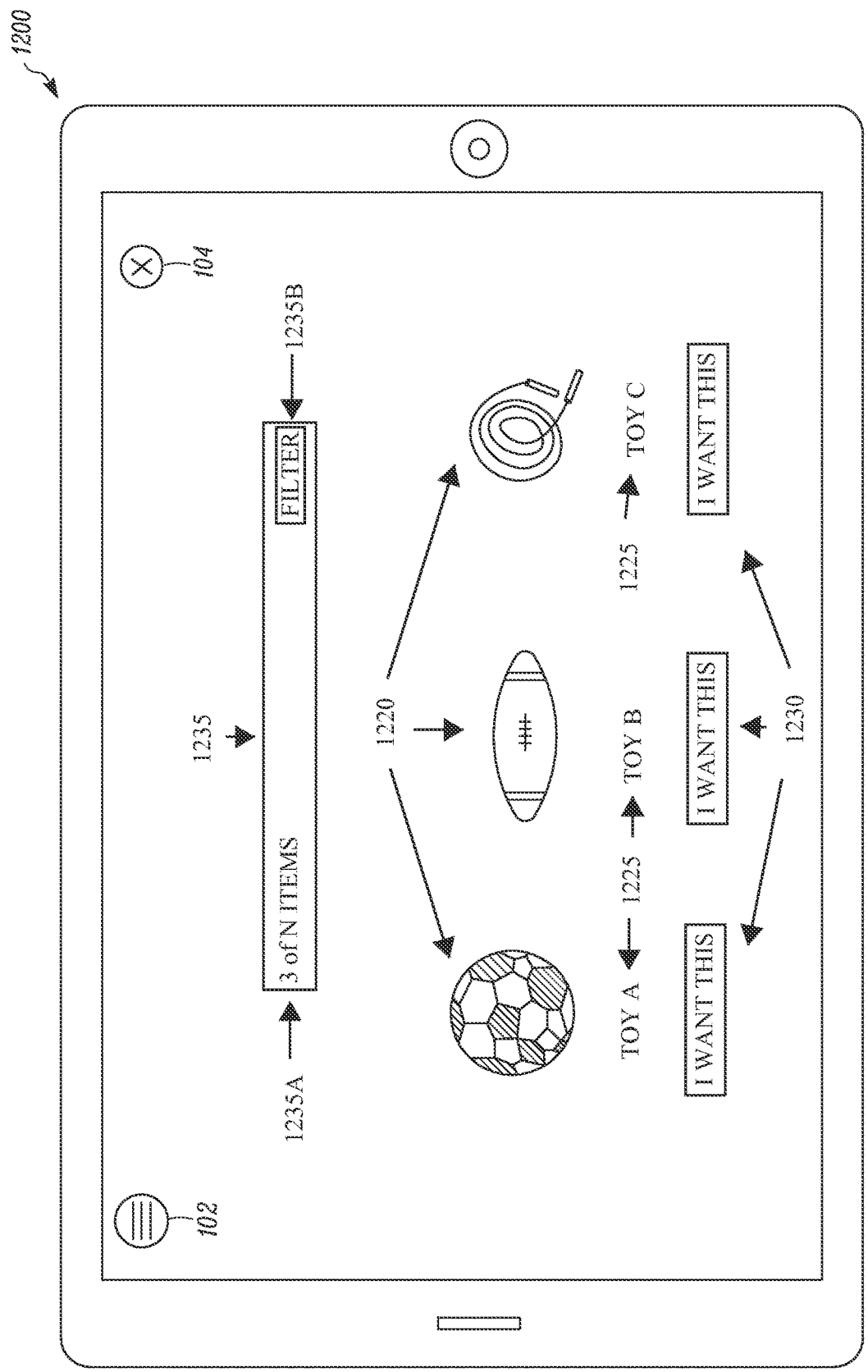
FIG. 13 illustrates an electronic wish list building user interface for the electronic wish list system as described herein, according to some embodiments.

The electronic wish list category GUI 1000 includes a plurality of category options 1080A-1080H. The category options 1080A-1080H are generally selectable such that a wish list creator can view one or more items from the category selected. For example, if the wish list creator selects category option 1080A (e.g., Category 1), the wish list creator begins the electronic wish list creation process via the electronic wish list building GUI 1200 (FIG. 13). The items that the wish list creator will see in the electronic wish list building GUI 1200 will correspond to items selected from Category 1. Further, the look and feel of the electronic wish list building GUI 1200 may be dependent upon the selection in the electronic wish list category GUI 1000. In some embodiments, the category options 1080A-1080H may correspond to categories of products in a catalog of the retailer. It is to be appreciated that there can be fewer or additional category options 1080A-1080H. Examples of category options include, but are not limited to, Toys & Video Games; Electronics; Sports & Outdoor; Music, Movies, & Books; Clothing & Shoes; Furniture/Décor; Favorites; Characters; or the like. In some embodiments, the category options 1080A-1080H can include an image that is representative of the one or more items included in the particular category option. In some embodiments, one or more of the category options 1080A-1080H can be highlighted to the wish list creator. For example, one or more of the category options 1080A-1080H can be illustrated as being larger than the other of the category options 1080A-1080H. In some embodiments, one of the category options 1080A-1080H includes items from more than one of the other category options 1080A-1080H. For example, if the category option is a "characters" option, selecting this category may show all items (regardless of category) that correspond to a particular character. A character can include, for example, a character from a book, movie, video game, television show, toy series, or the like.

FIG. 13 illustrates an electronic wish list building GUI 1200 for the electronic wish list system as described herein, according to some embodiments. The electronic wish list building GUI 1200 is one manner in which a wish list creator can identify products to add to the wish list creator's electronic wish list. In some embodiments, the electronic wish list building GUI 1200 may not be accessible to the wish list owner. In some embodiments, the electronic wish list building GUI 1200 may be accessible from a mobile device, such as, but not limited to, a smartphone or a tablet-style device. In some embodiments, the wish list building GUI 1200 may be representative of an environment that is not game-like. The wish list building GUI 1200 may be an alternative to the wish list building GUI 120 of FIG. 5. In some embodiments which include the electronic wish list building GUI 1200 in place of the electronic wish list building GUI 120, a separate game-like feature can be included in which the electronic wish list creator can select whether to build an electronic wish list or whether to play the game.

The electronic wish list building GUI 1200 enables a wish list creator to identify and select items to be added to her electronic wish list. It is to be appreciated that the text, arrangement of the text, images, and the like, are intended to serve as examples for the electronic wish list building user interface 1200 and can vary according to principles described herein.

In the illustrated embodiment, the electronic wish list building GUI 1200 includes a plurality of items 1220. The items 1220 represent the various items within the category selected by the wish list creator. The items 1220 can be selected by the wish list creator by, for example, using a finger to touch (or hover over) the item 1220 of interest. In some embodiments, a stylus or other similar device can be used for selecting the item 1220 of interest on a touchscreen. The items 1220 can include a description 1225 and a button 1230 which is selectable to add a particular item to the wish list creator's wish list. As an item is added to the wish list, a confirmation message (not shown) may be displayed for the user. In some embodiments, a confirmation sound, vibration, or the like may be played for the user. As the user selects an item, a wish list item count can be incremented and displayed. In some embodiments, the popup message may also enable the wish list creator to indicate whether the selected item is a favorite or not, which may also include indicating how much the item is desired.

The electronic wish building GUI 1200 can include a filter option 1235. The filter option 1235 can include text 1235A describing what items are being shown, how the filter is being performed, or the like. The filter option 1235 can include a filter button 1235B which, when selected, may limit the listing of items being displayed on the wish list building GUI 1200. In some embodiments, the filter option 1235 can include a search option enabling a wish list creator to search for a particular item.

Figure 14:
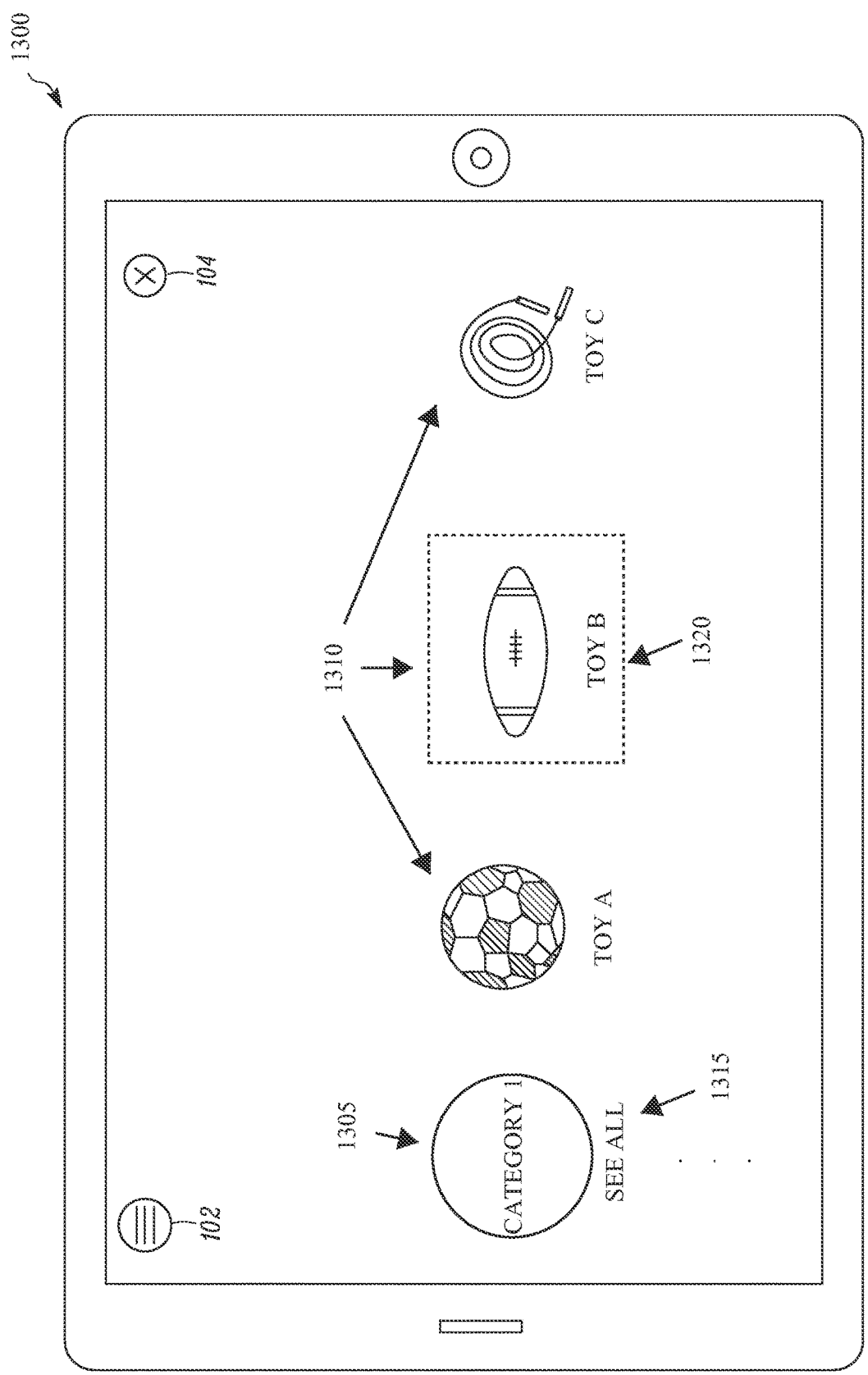
FIG. 14 illustrates an electronic wish list character user interface for the electronic wish list system as described herein, according to some embodiments.

FIG. 14 illustrates an electronic wish list character GUI 1500 for the electronic wish list system as described herein, according to some embodiments. The electronic wish list character GUI 1500 enables a wish list creator to browse items in various categories (e.g., category 1 in the illustrated embodiment) based on a particular character. The electronic wish list character GUI 1500 can include a category indicator 1305 which indicates which category a row of items contains. For example, in the illustrated embodiment, the row of items includes sports toys, so the category could be listed as Sports and Outdoor. The three items 1310 that are displayed can include toys from the particular category and are themed based on the particular character. One category is shown in the illustrated embodiment, but it will be appreciated that a plurality of categories can be displayed. The category indicator 1305 can also include an option 1315 to display all items from the particular category that are themed according to the selected character. It will be appreciated that the selected character can include a plurality of selected characters. In some embodiments, an indicator 1320 can be provided to highlight items 1310 which are already added to the wish list creator's wish list.

The terminology used herein is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are examples only, with the true scope and spirit of the disclosure being indicated by the claims that follow.

What is claimed is:

1. A method for facilitating preparation of an electronic wish list using an application with an augmented reality graphical user interface (GUI) for a user device, the user device having a display and including a camera, the application permitting a wish list creator to select one or more items to be added to the electronic wish list via the augmented reality GUI, the method comprising:

the augmented reality GUI displaying at least a portion of an advertisement from a retailer upon the portion of the advertisement being in view of the camera;

the augmented reality GUI scanning a plurality of product images included in the portion of the advertisement being in view of the camera, wherein the advertisement is one of:

a printed advertisement appearing in at least one of a newspaper, a catalog, a magazine, a circular, and a mailer; and a non-printed advertisement appearing on a website;

the application matching the plurality of product images included in the portion of the advertisement being in view of the camera with corresponding images in a library of images;

in response to two or more of the plurality of product images being matched with corresponding images in a library of images, the augmented reality GUI displaying a wish list selection button associated with each of the two or more of the plurality of product images overlaid over at least a portion of each of the two or more of the plurality of product images, wherein each of the two or more wish list selection buttons allows a user to add an item of the one or more items associated with a particular product image of the two or more product images to the electronic wish list;

in response to one of the plurality of product images not being matched with a corresponding image in the library of images, the augmented reality GUI displaying no wish list selection button over the one of the plurality of product images on the augmented reality GUI;

the augmented reality GUI receiving a selection, via one or more of the wish list selection buttons associated with the two or more of the plurality of product images, of the one or more items from the user device;

upon receiving the selection of the one or more items from the user device, via the one or more of the wish list selection buttons associated with the two or more of the plurality of product images, the application automatically adding the selection to the electronic wish list, wherein the electronic wish list is a list of the selected one or more items that is viewable by parties other than the wish list creator with access to the electronic wish list, indicates which of the one or more items has been purchased, and is selectable such that at least one of the selected one or more items is purchasable via the application;

the application sending the electronic wish list from the user device to a server;

the application receiving from the server product information about the one or more items on the wish list; and providing an electronic message for sharing the electronic wish list.

2. The method according to claim 1, wherein the augmented reality GUI receiving the selection of the one or more items from the user device includes dragging the product image in the augmented reality GUI to a location on the display.

3. The method according to claim 1, further comprising: providing an indication to a wish list owner that the wish list creator has shared the electronic wish list, wherein the wish list owner has an account, and the wish list creator is associated with the account.

4. The method according to claim 1, further comprising: providing a second electronic message to the wish list creator, the second electronic message being generated by a wish list owner, wherein the identity of the wish list owner is not included in the electronic message to the wish list creator.

5. The method according to claim 1, wherein the augmented reality GUI scanning the plurality of product images included in the portion of the advertisement being in view of the camera includes scanning a barcode.

6. The method according to claim 1, wherein the wish list creator can identify one or more of the one or more items to be added to the electronic wish list as a favorite.

7. The method according to claim 1, wherein the application further comprises permitting the wish list creator to electronically purchase one or more items of the selection of the one or more items added to the electronic wish list through the application via the user device.

8. The method according to claim 1, wherein a name of the wish list creator is electronically overlaid on a portion of the advertisement displayed by the augmented reality GUI.

9. The method according to claim 1, further comprising:
the augmented reality GUI displaying a wish list selection tube, and wherein the augmented reality GUI receiving the selection of the one or more items from the user device includes dragging a first wish list selection button of the one or more wish list selection buttons in the augmented reality GUI to the wish list selection tube, wherein the first wish list selection button is associated with a first product image of the plurality of product images, and wherein the first product image is associated with a first item of the one or more items to be added to the electronic wish list.

10. An electronic wish list system, comprising:
an application with an augmented reality graphical user interface (GUI) that is loadable onto a user device, the user device including a display and a camera, and that when the application is loaded onto the user device permits a wish list creator, via the augmented reality GUI, to review and select one or more items for inclusion in an electronic wish list, wherein the augmented reality GUI displays at least a portion of an advertisement from a retailer upon the portion of the advertisement being in view of the camera;

wherein the augmented reality GUI scans a plurality of product images included in the portion of the advertisement being in view of the camera, wherein the advertisement is one of:

a printed advertisement appearing in at least one of a newspaper, a catalog, a magazine, a circular, and a mailer; and a non-printed advertisement appearing on a website;

wherein the application matches the plurality of product images included in the portion of the advertisement being in view of the camera with corresponding images in a library of images;

wherein in response to two or more of the plurality of product images being matched with corresponding images in a library of images, the augmented reality GUI displays a wish list selection button associated with each of the two or more of the plurality of product images overlaid over at least a portion of each of the two or more of the plurality of product images, wherein each of the two or more wish list selection buttons allows a user to add an item of the one or more items associated with a particular product image of the two or more product images to the electronic wish list;

wherein in response to one of the plurality of product images not being matched with a corresponding image in the library of images, the augmented reality GUI displays no wish list selection button over the one of the plurality of product images on the augmented reality GUI;

wherein the augmented reality GUI receives a selection, via one or more of the wish list selection buttons associated with the two or more of the plurality of product images, of the one or more items from the user device;

wherein upon receiving the selection, via the one or more of the wish list selection buttons associated with the two or more of the plurality of product images, the application automatically adds the selection of the one or more items to the electronic wish list, wherein the electronic wish list is a list of the selected one or more items that is viewable by parties other than the wish list creator with access to the electronic wish list, indicates which of the one or more items has been purchased, and is selectable such that at least one of the selected one or more items is purchasable via the application;

a server able to communicate with the user device and configured to receive the electronic wish list from the user device, identify product information about the one or more items on the wish list, and send the electronic wish list with the product information to the application, wherein the application permits the wish list creator to share the electronic wish list via an electronic message, and in response to the sharing, a wish list owner is notified that the electronic wish list was shared.

11. The electronic wish list system according to claim 10, wherein the wish list owner is an account holder and the wish list creator is associated with an account of the wish list owner.

12. The electronic wish list system according to claim 10, wherein the server is able to communicate with one or more social networks, and the server is configured to receive the electronic wish list from the wish list owner and to send the electronic wish list to the one or more social networks.

13. The electronic wish list system according to claim 10, wherein an input of the augmented reality GUI is integrated with the display of the user device.

14. The electronic wish list system according to claim 10, wherein the application permits the user to use the camera of the mobile device to capture an image of one or more of a product barcode and an image of a product.

15. The electronic wish list system according to claim 10, wherein the application causes a name of the wish list creator to be electronically overlaid on a portion of the advertisement displayed by the augmented reality GUI.

16. The electronic wish list system according to claim 10, wherein the augmented reality GUI displaying a wish list selection tube, and
   wherein the augmented reality GUI receives the selection of the one or more items from the user device when a first wish list selection button of the one or more wish list selection buttons in the augmented reality GUI is dragged to the wish list selection tube, wherein the first wish list selection button is associated with a first product image of the plurality of product images, and wherein the first product image is associated with a first item of the one or more items to be added to the electronic wish list.

\* \* \* \* \*